(12) United States Patent
Kim et al.

(10) Patent No.: US 10,257,644 B2
(45) Date of Patent: Apr. 9, 2019

(54) SYSTEM AND METHOD FOR GRID-BASED GEO-FENCING SERVICE

(71) Applicant: SAMSUNG SDS CO., LTD., Seoul (KR)

(72) Inventors: Sung-Il Kim, Seoul (KR); Sung-Woo Lee, Seongnam-si (KR); Seong-Gab Cho, Seongnam-si (KR); Tae-Young Chung, Seongnam-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 235 days.

(21) Appl. No.: 15/159,951

(22) Filed: May 20, 2016

(65) Prior Publication Data

US 2016/0377438 A1 Dec. 29, 2016

(30) Foreign Application Priority Data

Jun. 25, 2015 (KR) .......................... 10-2015-0090396

(51) Int. Cl.
*G06F 11/30* (2006.01)
*H04W 4/021* (2018.01)
*H04W 4/029* (2018.01)
*H04W 4/02* (2018.01)

(52) U.S. Cl.
CPC ........... *H04W 4/021* (2013.01); *H04W 4/028* (2013.01); *H04W 4/029* (2018.02)

(58) Field of Classification Search
CPC ..................................................... H04W 4/021
See application file for complete search history.

(56) References Cited

U.S. PATENT DOCUMENTS 9,497,590 B1 * 11/2016 Gotoh .................. H04W 4/023

* cited by examiner

*Primary Examiner* — Phuong Huynh
(74) *Attorney, Agent, or Firm* — Sughrue Mion, PLLC

(57) ABSTRACT

Disclosed are a system and method for a grid-based geo-fencing service. A grid-based geo-fencing service system includes a storage unit configured to store area information including one or more grids and a determination unit configured to receive location coordinates of a moving object and determine whether the moving object is present in an area with reference to the area information. According to embodiments of the present disclosure, it is possible to effectively reduce the amount of calculation needed by a geo-fencing service system to determine whether location-tracking data corresponds to a specified area and thus effectively respond to the processing of a large amount of location-tracking data collected in real time.

13 Claims, 7 Drawing Sheets

100

SYSTEM AND METHOD FOR GRID-BASED GEO-FENCING SERVICE

CROSS-REFERENCE TO RELATED APPLICATION

This application claims priority to and the benefit of Korean Patent Application No. 10-2015-0090396, filed on Jun. 25, 2015, the disclosure of which is incorporated herein by reference in its entirety.

BACKGROUND

1. Field

Embodiments of the present disclosure relate to a location-tracking technology for a moving object, such as a vessel, an aircraft, etc.

2. Discussion of Related Art

With the advancement of a location-tracking technology, various application fields based on the location-tracking technology are also increasing in number, and also their accuracy is being enhanced. Geo-fencing is one of the application fields of such a location-tracking technology. "Geo-fencing" is a compound word of the words "geographic" and "fencing." Geo-fencing is a service that informs of the current situation when a user enters or exits a specified area. For example, a geo-fencing service system specifies an area surrounded by a virtual barrier, which is called a geo-fence, and informs that the user enters or exits the specified area.

A conventional geo-fencing service system forms an area in the shape of a polygon (or a circle). However, in this case, there is a problem in that a significant amount of calculation is required to determine whether location-tracking data collected in real-time corresponds to the polygonal area.

SUMMARY

Embodiments of the present disclosure provide technical means for reducing the amount of calculation needed by a geo-fencing service system to determine whether location-tracking data corresponds to a specified area.

According to an aspect of the present disclosure, there is provided a grid-based geo-fencing service system including: a storage unit configured to store area information including one or more grids; and a determination unit configured to receive location coordinates of a moving object and determine whether the moving object is present in an area with reference to the area information.

Each of the grids may include a set of points with the same effective coordinates obtained by rounding down coordinates in the area to a predetermined effective decimal place.

The area information may include reference locations of the one or more grids and information on the effective decimal place.

The reference positions may be determined according to the effective coordinates of points included in each of the one or more grids.

The determination unit may round down the location coordinates of the moving object to the effective decimal place to generate query coordinates and may determine that the moving object is present in the area when the query coordinates are the same as some of the reference coordinates of the one or more grids.

The grid-based geo-fencing service system may further include a conversion unit configured to convert a polygonal area into the one or more grids.

The conversion unit may select one or more grids with reference to the sizes of the grids which are calculated using the effective decimal place and coordinates in the polygonal area such that the entire polygonal area is covered.

According to another aspect of the present disclosure, there is provided a geo-fencing service method in a grid-based geo-fencing service system, the geo-fencing service method including: receiving location coordinates of a moving object; and determining whether the moving object is present in an area with reference to area information including one or more grids.

Each of the grids may include a set of points with the same effective coordinates obtained by rounding down coordinates in the area to a predetermined effective decimal place.

The area information may include reference locations of the one or more grids and information on the effective decimal place.

The reference positions may be determined according to the effective coordinates of points included in each of the one or more grids.

The determining may include rounding down the location coordinates of the moving object to the effective decimal place to generate query coordinates and determining that the moving object is present in the area when the query coordinates are the same as some of the reference coordinates of the one or more grids.

The geo-fencing service method may further include, before receiving the location coordinates, converting a polygonal area into the one or more grids.

The converting may include selecting one or more grids with reference to the sizes of the grids which are calculated using the effective decimal place and coordinates in the polygonal area such that the entire polygonal area is covered.

According to still another aspect of the present disclosure, there is provided a computer program stored in a recording medium that is combined with hardware and configured to execute a method, the method including: receiving location coordinates of a moving object; and determining whether the moving object is present in an area with reference to area information including one or more grids.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, embodiments of the present disclosure will be described in detail with reference to the accompanying drawings. The following detailed description will be provided for better understanding a method, an apparatus, and/or a system disclosed in this specification. However, the embodiments are only exemplary, and the present disclosure is not limited thereto.

In describing embodiments of the present disclosure, when it is determined that a detailed description of known techniques associated with the present disclosure would unnecessarily obscure the gist of the present disclosure, the detailed description thereof will be omitted. Also, terms used herein are defined in consideration of the functions of the present disclosure and may be changed depending on a user, the intent of an operator, or a custom. Accordingly, the terms must be defined based on the following overall description of this specification. The terminology used herein is for the purpose of only describing embodiments of the present disclosure and should not be restrictive. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components but do not preclude the presence or addition of one or more other features, integers, steps, operations, elements, components, and/or groups thereof.

Figure 1:
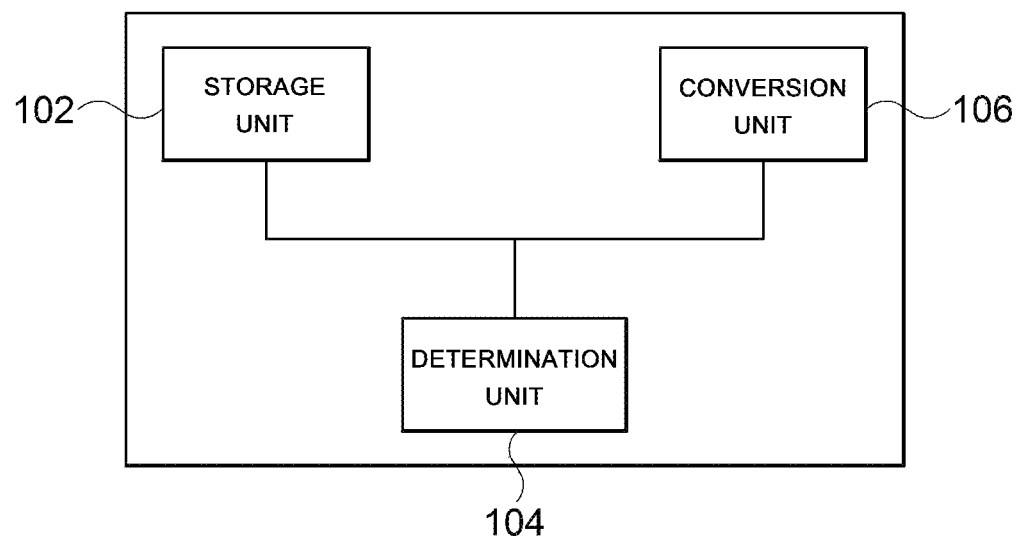
FIG. 1 is a block diagram for describing a geo-fencing service system according to an embodiment of the present disclosure.

FIG. 1 is a block diagram for describing a geo-fencing service system 100 according to an embodiment of the present disclosure. The geo-fencing service system 100 according to an embodiment of the present disclosure may denote a computer device for receiving a query including location coordinates of a moving object, determining whether the received location coordinates are in a specified area, and sending the determination back. As shown in FIG. 1, the geo-fencing service system 100 according to an embodiment of the present disclosure includes a storage unit 102 and a determination unit 104 and may further include a conversion unit 106 if necessary.

Figure 2:
FIG. 2 is an exemplary diagram for describing an example in which an area is formed as one or more grids in a geo-fencing service system according to an embodiment of the present disclosure.

The storage unit 102 stores and manages on one or more area information. According to an embodiment of the preset disclosure, each of the area information includes one or more grids. FIG. 2 is an exemplary diagram for describing an area including one or more grids according to an embodiment of the present disclosure. The exemplary diagram of FIG. 2 shows an example in which a predetermined area adjacent to a sea on a map includes 9 grids. As shown, each grid included in the area has the same size and does not overlap the other grids.

Figure 3:
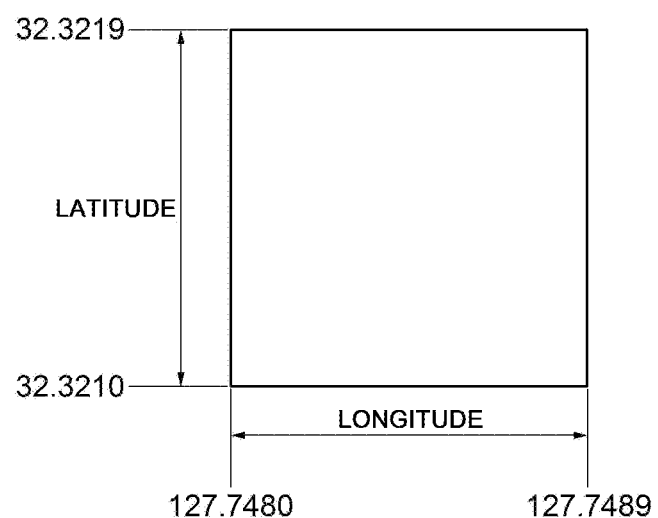
FIG. 3 is a partial enlarged view of one of the grids shown in the exemplary diagram of FIG. 2.

FIG. 3 enlarges a grid 200 among the grids shown in the exemplary diagram of FIG. 2. According to an embodiment of the present disclosure, each grid included in the area may include a set of points with the same effective coordinates obtained by rounding down coordinates in the area to a predetermined effective decimal place. For example, assuming that the location coordinates are determined as latitude and longitude coordinates and the effective decimal place of the location coordinates is the third decimal place (that is, decimal places after the third decimal place are not effective), an effective latitude coordinate of latitude coordinates from 127.7480 to 127.7489 is 127.748, and an effective longitude coordinate of longitude coordinates from 32.3210 to 32.3219 is 32.321. In other words, the latitudes coordinates from 127.7480 to 127.7489 and the longitude coordinates from 32.3210 to 32.3219 constitute one grid.

In this case, the size of each grid included in an area is determined according to an effective decimal place of location coordinates. When, as described above, the effective decimal place of the location coordinates is the third decimal place, the grid is in the shape of a square with the size of 0.001×0.001.

The enlarged view of FIG. 3 illustrates only two-dimensional (2D) grids, but embodiments of the preset disclosure are not limited thereto. In some embodiments, the area may be a three-dimensional (3D) space rather than a 2D plane. For example, the area is represented by three coordinates including latitude, longitude, and altitude. A plurality of grids (i.e., 3D grids) may be formed by dividing the area into a plurality of rectangular parallelepipeds. In the following description, embodiments of the present disclosure will be mainly described on the basis of 2D areas and grids. It should be understood, however, that the embodiments may also be applied to 3D areas and grids without changing the technical spirit of the present disclosure.

In an embodiment, area information stored in the storage unit 102 may include a reference location and size information of each of one or more grids included in the area. In this case, the reference location may be determined according to effective coordinates of points included in each of the one or more grids. For example, for the grid 200 shown in FIG. 3, the effective coordinates are (32.321, 127.748).

Figure 4:
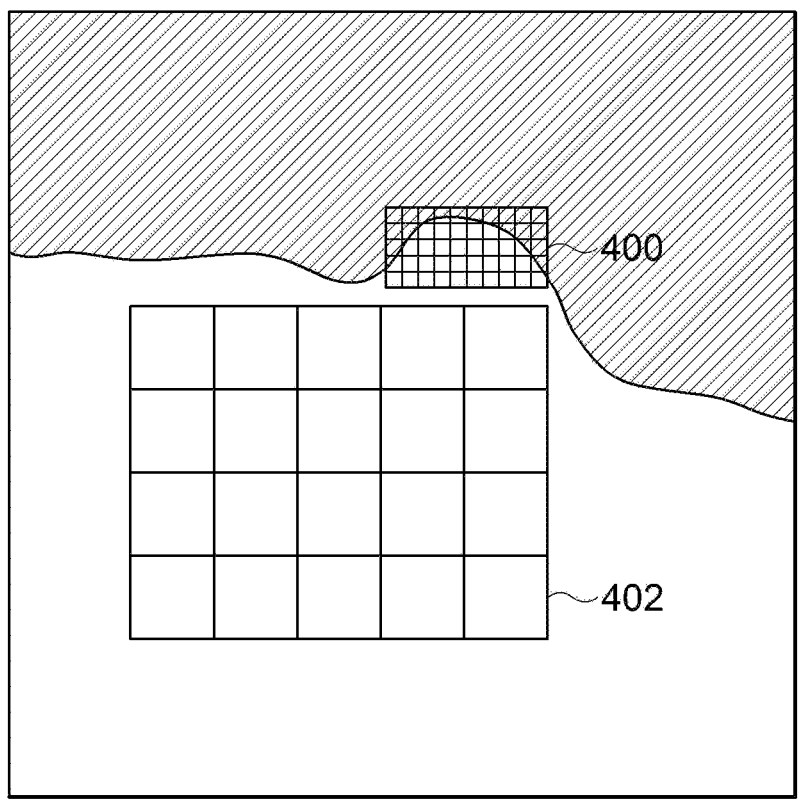
FIG. 4 is an exemplary diagram for describing an example in which the size of a grid is set differently for each area in a geo-fencing service system according to an embodiment of the present disclosure.

In an embodiment of the present disclosure, the sizes of the grids may be set differently for each area. For example, the sizes of the grids may be decreased by increasing the range of the effective decimal place when a relatively high level of accuracy is required, and the sizes of the grids may be increased by decreasing the range of the effective decimal place when only a relatively low level of accuracy is needed. FIG. 4 illustrates this. It can be seen that an area represented by reference numeral 400 has a smaller grid than an area indicated by reference numeral 402.

Next, the determination unit 104 receives location coordinates of a moving object and determines whether the moving object is present in an area with reference to the area information. In an embodiment of the present disclosure, the moving object may include a pedestrian, an animal, etc. which moves while carrying a location-tracking device such as a smartphone or a wearable device including a GPS as well as any type of manned or unmanned moving means generally used to transport passengers or cargo including a vehicle, a vessel, an aircraft, a helicopter, a drone, etc.

In detail, the determination unit 104 may round down the location coordinates of the moving object to the effective decimal place to generate query coordinates and may determine that the moving object is present in the area when the query coordinates are the same as some of the reference coordinates of the one or more grids.

For example, assuming that location coordinates received from a specific moving object are (32.3217, 127.7483), the query coordinates generated from the location coordinates are (32.321, 127.748) when the effective decimal place is the third decimal place as described above. That is, since the location coordinates are the same as the reference coordinates of the grid 200 shown in FIG. 3, the determination unit 104 may determine that the location coordinates are inside the grid 200.

A conventional geo-fencing system has an area shaped as a polygon, and stores vertex information of the polygon as index information. In this case, when a query about whether there are specific coordinates in the polygon is received, a calculation using a complicated function is needed for a relationship between the coordinates and the polygon. On the other hand, the geo-fencing service system 100 according to embodiments of the present disclosure is configured to convert the area into a plurality of grids and store reference coordinate information of each grid as index information. Accordingly, according to embodiments of the present disclosure, only by comparing the received coordinates with prestored reference coordinates without the complicated polygonal function calculation, to which area the coordinates belong may be obtained. Thus, it is possible to significantly reduce the amount of calculation compared to the conventional method.

The geo-fencing service system 100 according to an embodiment of the present disclosure may further include a conversion unit 106 configured to convert the polygonal area into the one or more grids. In an embodiment, the conversion unit 106 may convert a polygonal area into one or more grids by selecting one or more grids with reference to the sizes of the grids which are calculated using the effective decimal place and coordinates in the polygonal area such that the entire polygonal area is covered.

Figure 5:
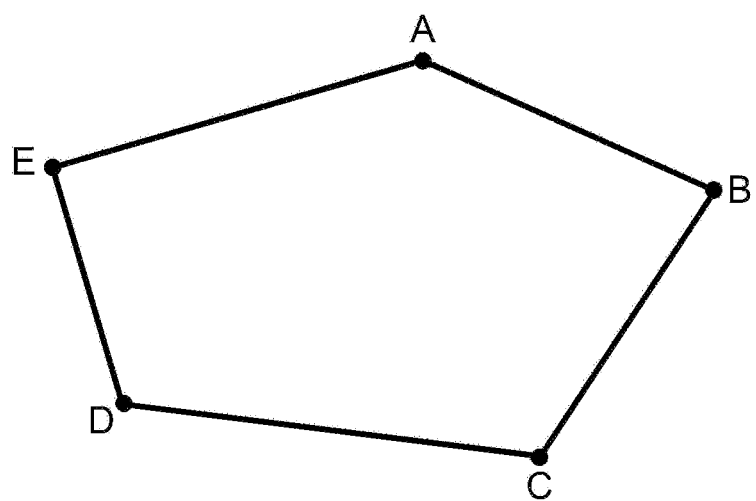
FIGS. 5 and 6 are exemplary diagrams for describing an example in which a polygonal area is converted into a grid in a geo-fencing service system according to an embodiment of the present disclosure.
Figure 6:
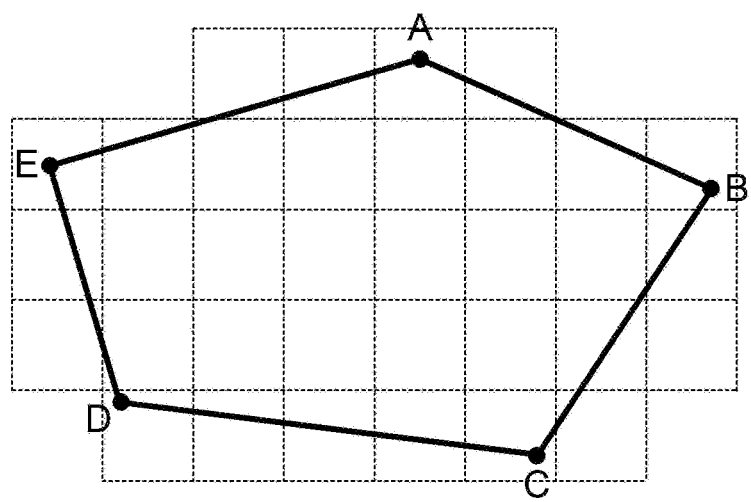

FIGS. 5 and 6 are exemplary diagrams for describing an example in which a polygonal area is converted into grids in a geo-fencing service system 100 according to an embodiment of the present disclosure. For example, when there is a pentagonal area including points A, B, C, D, and E, as shown in FIG. 5, the conversion unit 106 converts the area into a set of grids with a predetermined size such that the entire pentagonal area is covered, as shown in FIG. 6.

In an embodiment, the storage unit 102, the determination unit 104, and the conversion unit 106 may be implemented on a computing device including at least one processor and a computer-readable recording medium connected with the processor. The computer-readable recording medium may be disposed inside or outside the processor and may be connected with the processor using various well-known means. The processor in the computing device may enable the computing device to operate according to an exemplary embodiment described in this specification. For example, the processor may execute an instruction stored in the computer-readable recording medium, and the instruction stored in the computer-readable recording medium may be configured to enable the computing device to perform operations according to an exemplary embodiment described in this specification when the instruction is executed by the processor.

Figure 7:
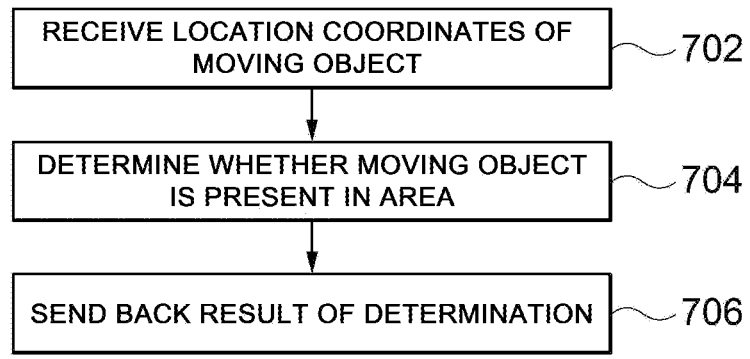
FIG. 7 is a flowchart for describing a geo-fencing service method according to an embodiment of the present disclosure.

FIG. 7 is a flowchart for describing a geo-fencing service method 700 according to an embodiment of the present disclosure. The method shown in FIG. 7 may be performed by, for example, the geo-fencing service system 100. Although, in the shown flowchart, the method will be described to have a plurality of steps, at least some of the steps may be performed in different order, performed in combination, omitted, performed in sub-steps, or performed in addition to one or more steps that are not shown.

In S702, the determination unit 104 of the geo-fencing service system 100 receives location coordinates of a moving object.

In S704, the determination unit 104 determines whether the location of the moving object corresponds to any one of one or more grids included in the area with reference to area information stored in the storage unit 102.

As described above, the grid may include a set of points with the same effective coordinates obtained by rounding down coordinates in the area to a predetermined effective decimal place. In addition, the area information may include reference locations of the one or more grids and information on the effective decimal place.

Thus, the determination unit 104 may round down the location coordinates of the moving object to the effective decimal place to generate query coordinates and may determine that the moving object is present in the area when the query coordinates are the same as some of the reference coordinates of the one or more grids.

In S706, the determination unit 104 sends back a result of the determination performed in S704.

According to embodiments of the present disclosure, it is possible to effectively reduce the amount of calculation needed by a geo-fencing service system to determine whether location-tracking data corresponds to a specified area and thus effectively respond to the processing of a large amount of location-tracking data collected in real time.

Embodiments of the present disclosure may include a program for performing methods described in this specification on a computer and a computer-readable recording medium including the program. The computer-readable recording medium may include a program instruction, a local data file, a local data structure, or a combination thereof. The medium may be designed and configured specifically for the present disclosure or can be typically available in the field of computer software. Examples of the computer-readable recording medium include a magnetic medium, such as a hard disk, a floppy disk, and a magnetic tape, an optical recording medium, such as a CD-ROM, a DVD, etc., and a hardware device specially configured to store and perform a program instruction, such as a ROM, a RAM, a flash memory, etc. Examples of the program include a high-level language code executable by a computer with an interpreter, in addition to a machine language code made by a compiler.

Although exemplary embodiments of the present disclosure have been described in detail, it will be understood by those skilled in the art that various changes may be made without departing from the spirit or scope of the present disclosure. Thus, the scope of the present disclosure is to be determined by the following claims and their equivalents, and shall not be restricted or limited by the foregoing detailed description.

What is claimed is:

1. A grid-based geo-fencing service system comprising:
   a storage unit configured to store area information for an area including one or more grids; and
   a determination unit configured to receive location coordinates of a moving object and determine whether the moving object is present in the area with reference to the area information,
   wherein each of the one or more grids includes a set of points with the same effective coordinates, and
   wherein the same effective coordinates are obtained by rounding down coordinates in the area to a predetermined effective decimal place.

2. The grid-based geo-fencing service system of claim 1, wherein the area information includes reference locations of the one or more grids and information on the effective decimal place.

3. The grid-based geo-fencing service system of claim 2, wherein the reference locations are determined according to the effective coordinates of points included in each of the one or more grids.

4. The grid-based geo-fencing service system of claim 3, wherein the determination unit rounds down the location coordinates of the moving object to the effective decimal place to generate query coordinates and determines that the moving object is present in the area when the query coordinates are the same as some of the reference coordinates of the one or more grids.

5. The grid-based geo-fencing service system of claim 1, further comprising a conversion unit configured to convert a polygonal area into the one or more grids.

6. The grid-based geo-fencing service system of claim 5, wherein the conversion unit selects one or more grids with reference to the sizes of the grids which are calculated using the effective decimal place and coordinates in the polygonal area such that the entire polygonal area is covered.

7. A geo-fencing service method in a grid-based geo-fencing service system, the geo-fencing service method comprising:

receiving location coordinates of a moving object; and determining whether the moving object is present in an area including one or more grids with reference to area information for the area, wherein each of the one or more grids includes a set of points with the same effective coordinates, and wherein the same effective coordinates are obtained by rounding down coordinates in the area to a predetermined effective decimal place.

8. The geo-fencing service method of claim 7, wherein the area information includes reference locations of the one or more grids and information on the effective decimal place.

9. The geo-fencing service method of claim 8, wherein the reference locations are determined according to the effective coordinates of points included in each of the one or more grids.

10. The geo-fencing service method of claim 9, wherein the determining comprises rounding down the location coordinates of the moving object to the effective decimal place to generate query coordinates and determining that the moving object is present in the area when the query coordinates are the same as some of the reference coordinates of the one or more grids.

11. The geo-fencing service method of claim 7, further comprising, before receiving the location coordinates, converting a polygonal area into the one or more grids.

12. The geo-fencing service method of claim 11, wherein the converting comprises selecting one or more grids with reference to the sizes of the grids which are calculated using the effective decimal place and coordinates in the polygonal area such that the entire polygonal area is covered.

13. A computer program stored in a non-transitory recording medium that is combined with hardware and configured to execute a method, the method comprising:

receiving location coordinates of a moving object; and determining whether the moving object is present in an area including one or more grids with reference to area information for the area, wherein each of the one or more grids includes a set of points with the same effective coordinates, and wherein the same effective coordinates are obtained by rounding down coordinates in the area to a predetermined effective decimal place.

* * * * *